United States Patent
Endo et al.

(10) Patent No.: US 7,802,473 B2
(45) Date of Patent: Sep. 28, 2010

(54) ANGULAR VELOCITY SENSOR

(75) Inventors: Yuki Endo, Yokohama (JP); Hiroshi Tanaka, Yokohama (JP); Tomoaki Momose, Yokohama (JP); Masanori Yachi, Yokohama (JP)

(73) Assignee: Tamagawa Seiki Co., Ltd., Nagano Prefecture (JP)

( * ) Notice: Subject to any disclaimer, the term of this patent is extended or adjusted under 35 U.S.C. 154(b) by 98 days.

(21) Appl. No.: 12/004,483

(22) Filed: Dec. 21, 2007

(65) Prior Publication Data

US 2008/0210006 A1 Sep. 4, 2008

(30) Foreign Application Priority Data

Dec. 22, 2006 (JP) .............................. 2006-346807

(51) Int. Cl.
G01P 3/44 (2006.01)

(52) U.S. Cl. ................................. 73/504.16; 73/514.02

(58) Field of Classification Search .............. 73/504.16, 73/504.02, 504.03, 504.14, 514.01, 514.02, 73/514.32

See application file for complete search history.

(56) References Cited

U.S. PATENT DOCUMENTS

| | | | | |
|---|---|---|---|---|
| 5,251,483 A | * | 10/1993 | Soderkvist | ............... 73/504.16 |
| 6,119,519 A | * | 9/2000 | Konno et al. | .............. 73/504.16 |
| 6,205,857 B1 | * | 3/2001 | Nakajima | ................. 73/504.16 |
| 6,865,945 B2 | * | 3/2005 | Hayashi et al. | ........... 73/504.16 |
| 7,069,783 B2 | * | 7/2006 | Uehara | ..................... 73/514.12 |
| 2003/0029239 A1 | * | 2/2003 | Hatanaka et al. | .......... 73/504.16 |
| 2004/0187574 A1 | * | 9/2004 | Hayashi et al. | ........... 73/514.16 |
| 2005/0088250 A1 | * | 4/2005 | Matsudo et al. | .............. 331/154 |
| 2005/0178202 A1 | * | 8/2005 | Uehara | ......................... 73/497 |
| 2006/0226741 A1 | * | 10/2006 | Ogura et al. | ................. 310/366 |

FOREIGN PATENT DOCUMENTS

| | | | |
|---|---|---|---|
| JP | 07260489 A | * | 10/1995 |
| JP | 08-304075 | | 11/1996 |
| JP | 10-206167 A | | 8/1998 |
| JP | 10-253363 A | | 9/1998 |
| JP | 2000-193457 | | 7/2000 |
| JP | 2000-283764 | | 10/2000 |
| JP | 2003-156338 | | 5/2003 |
| JP | 2005134364 A | * | 5/2005 |

* cited by examiner

*Primary Examiner*—Hezron Williams
*Assistant Examiner*—Samir M Shah
(74) *Attorney, Agent, or Firm*—Arent Fox LLP

(57) ABSTRACT

An angular velocity sensor includes a tuning-fork oscillator that includes a base portion, arm portions extending from the base portion, and a pair of driving electrodes that are provided to extend from the front face and the back face to a side face of at least one of the arm portions.

7 Claims, 15 Drawing Sheets

FIG. 1A
FIG. 1B
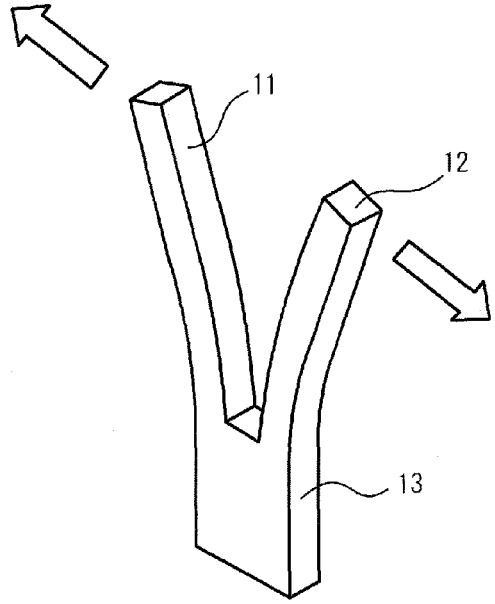
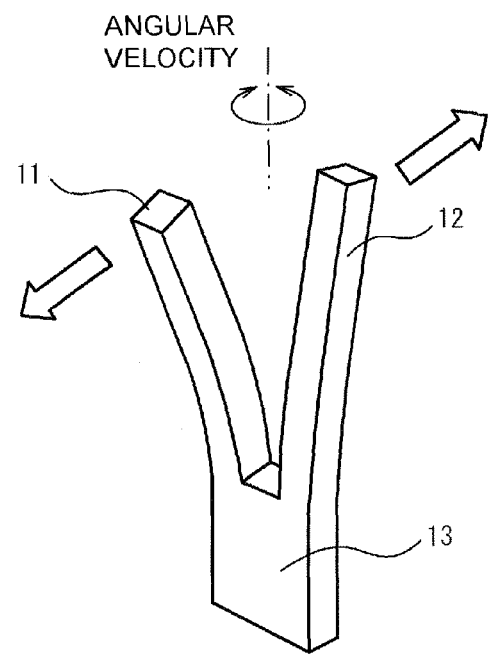
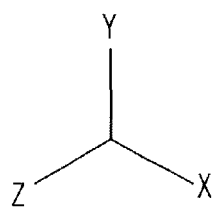

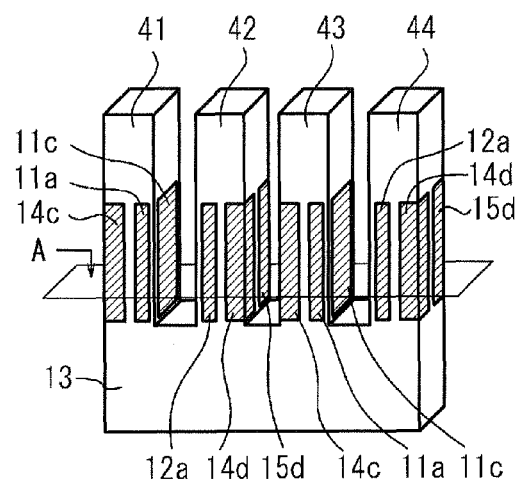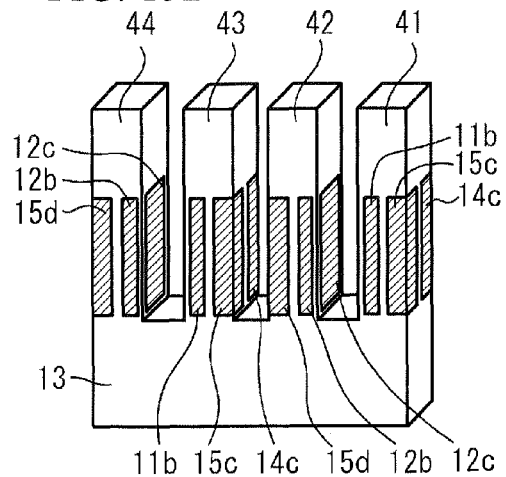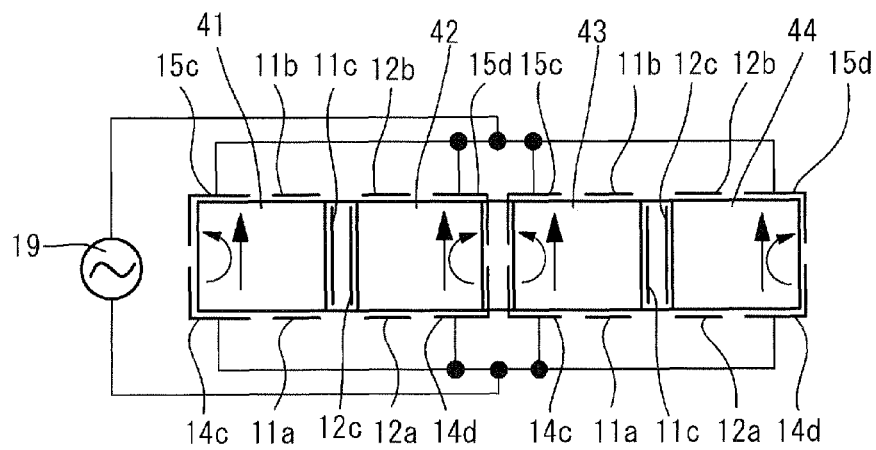

ANGULAR VELOCITY SENSOR

BACKGROUND OF THE INVENTION

1. Field of the Invention

The present invention generally relates to an angular velocity sensor, and more particularly, to an angular velocity sensor having a tuning-fork oscillator.

2. Description of the Related Art

An angular velocity sensor is a sensor that senses angular velocity while the object is rotating, and is used in systems for preventing camera shakes, for navigating vehicles, for controlling positions of vehicles or postures of robots, and the likes. Japanese Unexamined Patent Publication No. 2001-165664 discloses an angular velocity sensor that uses tuning-fork oscillators. In this angular velocity sensor, two tuning-fork oscillators are bonded directly to each other, so that the generated charges have the opposite signs from the charges generated in each other tuning-fork oscillator. In this manner, the driving efficiency is increased by adjusting the electrode arrangement.

As angular velocity sensors have been becoming smaller, tuning-fork oscillators have also been becoming smaller. With smaller tuning-form oscillators, the driving efficiency becomes lower. When the driving efficiency becomes lower, the amplitude of driving oscillations becomes smaller. When angular velocity is applied, the amplitude of sensing oscillations generated by Coriolis force becomes relatively smaller, and therefore, it becomes difficult to sense the angular velocity.

For instance, the angular velocity sensor disclosed in Japanese Unexamined Patent Publication No. 2001-165664 requires the process of bonding tuning-fork oscillators so that the generated charges have the opposite signs. As a result, the number of manufacturing procedures becomes larger, and the production costs become higher. Further, the driving efficiency becomes lower due to bonding misalignment in the bonding process.

SUMMARY OF THE INVENTION

It is therefore an object of the present invention to provide an angular velocity sensor in which the above disadvantage is eliminated.

A more specific object of the present invention is to provide an angular velocity sensor that achieves high driving efficiency with a simple structure.

According to an aspect of the present invention, there is provided an angular velocity sensor that includes: a tuning-fork oscillator that includes a base portion, a plurality of arm portions extending from the base portion, and a pair of driving electrodes that are provided to extend from a front face and a back face to a side face of at least one of the arm portions. Thus, an angular velocity sensor that achieves high driving efficiency with a simple structure can be provided by increasing the density of electric fields generated in the arm portions.

BRIEF DESCRIPTION OF THE DRAWINGS

Other objects, features and advantages of the present invention will become more apparent from the following detailed description when read in conjunction with the accompanying drawings, in which:

FIG. 1A illustrates driving oscillation;

FIG. 1B illustrates sensing oscillation;

FIG. 15A is a perspective view of the front face of an angular velocity sensor in accordance with a first modification of the fourth embodiment;

FIG. 15B is a perspective view of the back face of the angular velocity sensor of the first modification; and FIG. 15C is a schematic view of a structure in which the angular velocity sensor is connected to a driving power source.

DESCRIPTION OF THE PREFERRED EMBODIMENTS

Referring first to FIGS. 1A and 1B, driving oscillations and sensing oscillations of a tuning-fork oscillator are described. As shown in FIG. 1A, driving signals are applied to the driving electrodes (not shown) of the tuning-fork oscillator, so as to generate such oscillations that arm portions 11 and 12 open and close with respect to each other. Such oscillations are parallel to the X-axis, and are called driving oscillations. When angular velocity is applied to the Y-axis, the arm portions 11 and 12 oscillate back and forth by virtue of Coriolis force, as shown in FIG. 1B. Such oscillations are parallel to the Z-axis, and are called sensing oscillations. Sensing electrodes (not shown) detect such sensing oscillations, so that the angular velocity about the Y-axis can be sensed. The longitudinal direction of the arm portions 11 and 12 of the tuning-fork oscillator is the Y-axis, the width direction of the arm portions 11 and 12 is the X-axis, and the thickness direction of the arm portions 11 and 12 is the Z-axis (the same applies to the structures described in the following description).

The following is a description of embodiments for improving the efficiency of the driving oscillations, with reference to the accompanying drawings.

First Embodiment

Figure 2A:
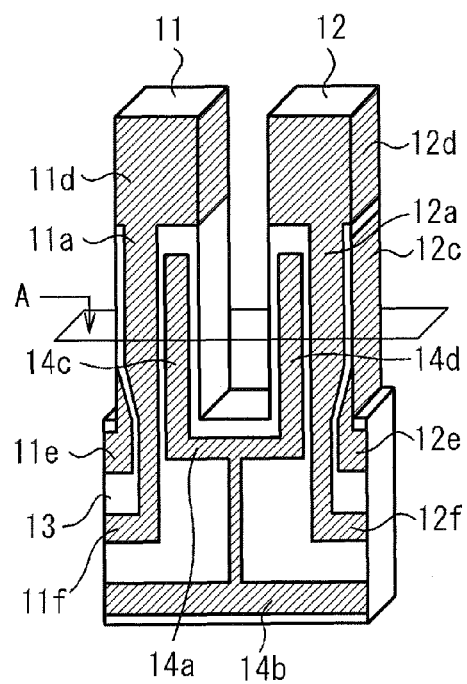
FIG. 2A is a perspective view of the front face of an angular velocity sensor of Comparative Example 1.
Figure 2B:
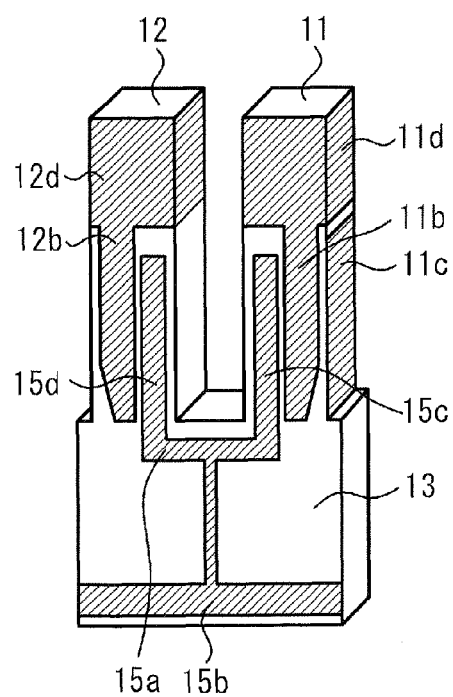
FIG. 2B is a perspective view of the back face of the angular velocity sensor of Comparative Example 1.
Figure 3A:
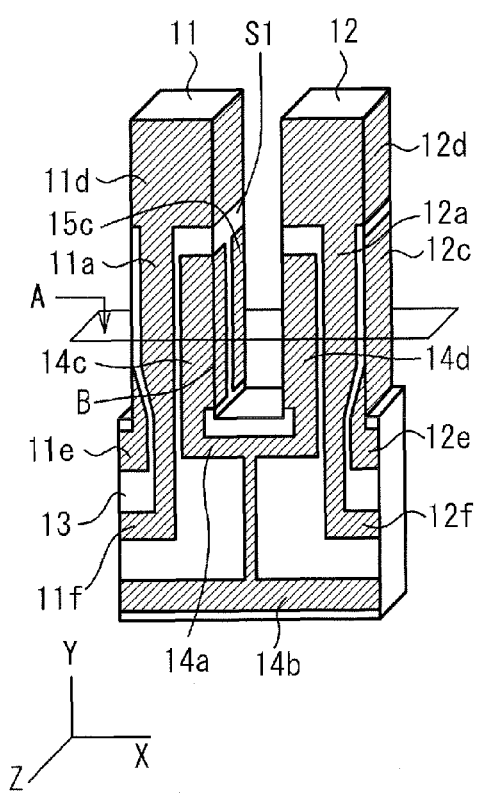
FIG. 3A is a perspective view of the front face of an angular velocity sensor in accordance with a first embodiment of the present invention.
Figure 3B:
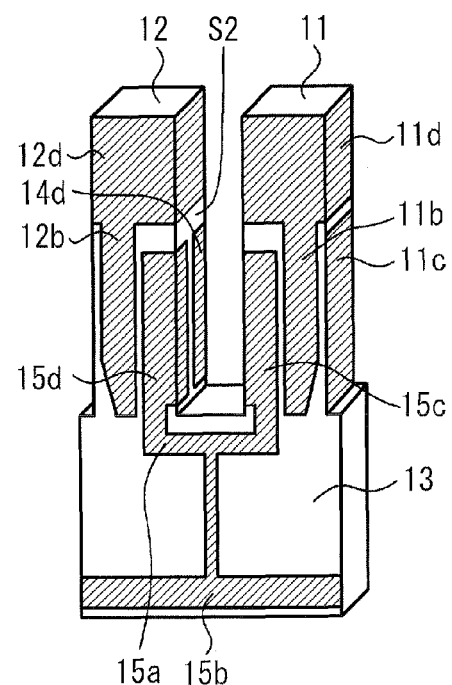
FIG. 3B is a perspective view of the back face of the angular velocity sensor of the first embodiment.

A first embodiment of the present invention is an example of an angular velocity sensor that has a tuning-fork oscillator formed with two arm portions. FIG. 2A is a perspective view of the front face of the tuning-fork oscillator of an angular velocity sensor as Comparative Example 1. FIG. 2B is a perspective view of the back face of the tuning-fork oscillator of Comparative Example 1. FIG. 3A is a perspective view of the front face of the tuning-fork oscillator of an angular velocity sensor in accordance with the first embodiment. FIG. 3B is a perspective view of the back face of the tuning-fork oscillator of the first embodiment. Here, the front face of a tuning-fork oscillator is the X-Y plane of the tuning-fork oscillator, and the back face of the tuning-fork oscillator is the X-Y plane on the opposite side from the front face of the tuning-fork oscillator (the same applies to the following description).

As shown in FIGS. 2A and 2B, the tuning-fork oscillator of Comparative Example 1 has two arm portions 11 and 12 extending from a base portion 13. Sensing electrodes 11a, 11b, and 11c are provided on the arm portion 11. The sensing electrodes 11a and 11b are connected to each other with an electrode 11d. An extending electrode 11f is provided on the sensing electrode 11a. The sensing electrode 11c is provided on a side face of the arm portion 11, and is connected to an extending electrode 11e. Likewise, sensing electrodes 12a, 12b, and 12c are provided on the arm portion 12. The sensing electrodes 12a and 12b are connected to each other with an electrode 12d. An extending electrode 12f is provided on the sensing electrode 12a. The sensing electrode 12c is provided on a side face of the arm portion 12, and is connected to an extending electrode 12e. A driving electrode 14a is provided on the front faces of the base portion 13 and the arm portions 11 and 12, and is connected to an extending electrode 14b. Likewise, a driving electrode 15a is provided on the back faces, and is connected to an extending electrode 15b. Here, the driving electrode 14a provided on the front faces of the arm portions 11 and 12 is formed with driving electrodes 14c and 14d. The driving electrodes 15a provided on the back faces of the arm portions 11 and 12 is formed with driving electrodes 15c and 15d (the same applies to the structures described later). The base portion 13 and the arm portions 11 and 12 are formed with piezoelectric single-crystal of lithium niobate (LiNbO$_3$). The sensing electrodes and the driving electrodes are formed with metal films made of gold (Au), with an alloy film of nickel (Ni) and chromium (Cr) being a base layer.

As shown in FIGS. 3A and 3B, the driving electrode 14c provided on the front face of the arm portion 11 extends along the side face S1 of the arm portion 11 facing the arm portion 12, and the driving electrode 14d provided on the front face of the arm portion 12 extends along the side face S2 of the arm portion 12 facing the arm portion 11. Likewise, the driving electrode 15c provided on the back face of the arm portion 11 extends along the side face S1 of the arm portion 11 facing the arm portion 12, and the driving electrode 15d provided on the back face of the arm portion 12 extends along the side face S2 of the arm portion 12 facing the arm portion 11. The other aspects of the structure are the same as those of Comparative Example 1 shown in FIGS. 2A and 2B, and therefore, explanation of them is omitted here. Also, the driving electrodes 14c and 15c forms a pair of driving electrodes, and the driving electrodes 14d and 15d form a pair of driving electrodes. The side face S1 of the arm portion 11 and the side face S2 of the arm portion 12 are also referred to as the inner side faces of the arm portions 11 and 12.

Also, the electrode patterns on the front faces and the back faces of the base portion 13 and the arm portions 11 and 12 shown in FIGS. 3A and 3B are formed by performing vertical exposure in which light is emitted perpendicularly to the front faces and the back faces of the base portion 13 and the arm portions 11 and 12. Further, the electrode patterns on the side faces of the arm portions 11 and 12, and the electrode patterns at the edge portions between the front faces and back faces of the arm portions 11 and 12 and the side faces of the arm portions 11 and 12 are formed by performing diagonal exposure in which light is emitted diagonally at a certain angle with respect to the vertical exposure.

Figure 4A:
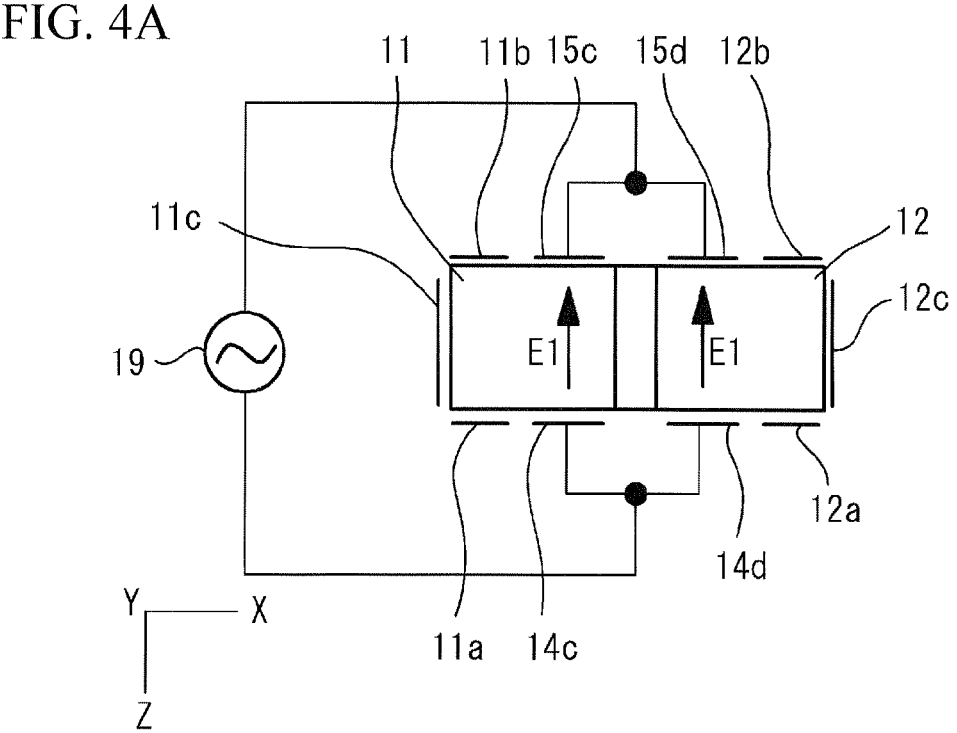
FIG. 4A is a schematic view of a structure in which the angular velocity sensor of Comparative Example 1 is connected to a driving power source.
Figure 4B:
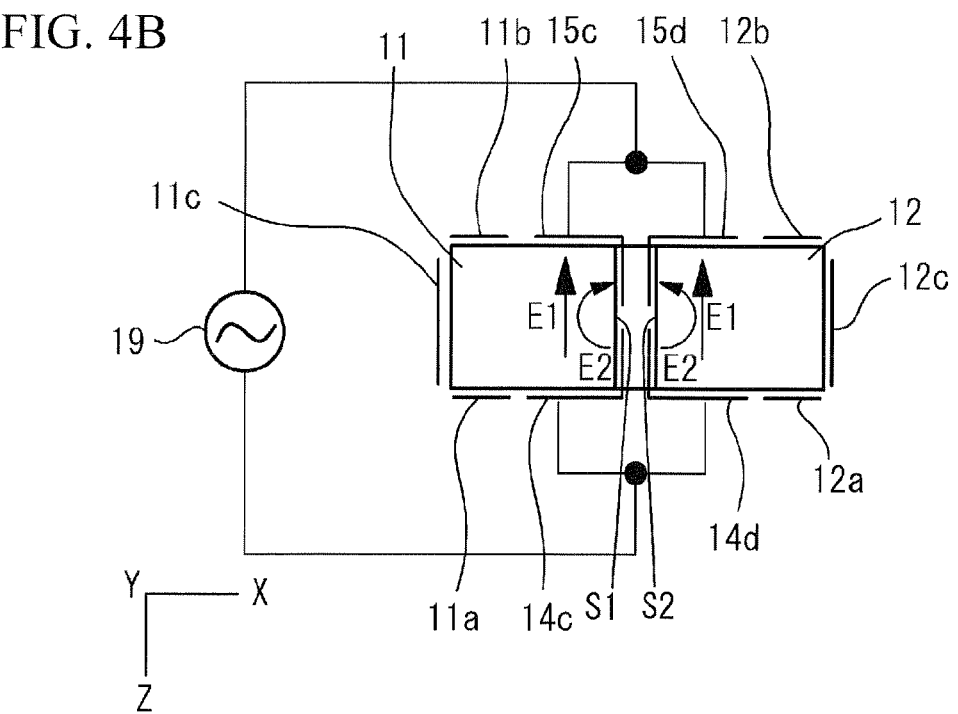
FIG. 4B is a schematic view of a structure in which the angular velocity sensor of the first embodiment is connected to a driving power source.

FIG. 4A is a schematic view of a structure in which a driving power source 19 is connected to the tuning-fork oscillator of the angular velocity sensor of Comparative Example 1. FIG. 4A shows the X-Z sectional view of the tuning-fork oscillator, with the A section of the tuning-fork oscillator of FIG. 2A being seen from the opposite side from the base portion 13. Likewise, FIG. 4B is a schematic view of a structure in which a driving power source 19 is connected to the tuning-fork oscillator of the angular velocity sensor of the first embodiment. FIG. 4B shows the X-Z sectional view of the tuning-fork oscillator, with the A section of the tuning-fork oscillator of FIG. 3A being seen from the opposite side from the base portion 13. The arrows in FIGS. 4A and 4B indicate the electric field directions (the same applies to the structures described later).

As shown in FIG. 4A, a positive driving signal is applied to the driving electrode 14c on the front face of the arm portion 11 and the driving electrode 14d on the front face of the arm portion 12, and a negative driving signal is applied to the driving electrode 15c on the back face of the arm portion 11 and the driving electrode 15d on the back face of the arm portion 12. Accordingly, an electric field directed from the driving electrode 14c to the driving electrode 15c is generated in the arm portion 11, and an electric field directed from the driving electrode 14d to the driving electrode 15d is generated in the arm portion 12. With the electric fields, the arm portions 11 and 12 have such driving oscillations that the arm portion 11 and 12 open and close. Since the driving signals are AC signals, the positive and negative signs of the driving signals to be applied to the driving electrodes switch with time.

As shown in FIG. 4B, a positive driving signal is applied to the driving electrode 14c on the front face of the arm portion 11 and the driving electrode 14d on the front face of the arm portion 12, and a negative driving signal is applied to the driving electrode 15c on the back face of the arm portion 11 and the driving electrode 15d on the back face of the arm portion 12, as in the case shown in FIG. 4A. Accordingly, an electric field directed from the driving electrode 14c to the driving electrode 15c is generated in the arm portion 11, and an electric field directed from the driving electrode 14d to the driving electrode 15d is generated in the arm portion 12. More specifically, driving signals are applied to a pair of driving electrodes 14c and 15c and a pair of driving electrodes 14d and 15d provided on the two arm portions 11 and 12 having driving oscillations with respect to each other, so that the electric fields generated in the two arm portions 11 and 12 are directed in the same direction as each other. With the electric fields, the arm portions 11 and 12 have such driving oscillations that the arm portion 11 and 12 open and close with respect to each other.

Table 1 shows the results of driving impedance experiments carried out on the tuning-fork oscillator of the angular velocity sensor of Comparative Example 1 and the tuning-fork oscillator of the angular velocity sensor of the first embodiment, with the values of the results being standardized by the value of the result of Comparative Example 1. Being of a piezoelectric material and a dielectric material, each tuning-fork oscillator has very high impedance. However, when having driving oscillations, each tuning-fork oscillator has low driving impedance. When the driving oscillations are interfered, the driving impedance of each tuning-fork oscillator becomes higher. Accordingly, as long as each tuning-fork oscillator has driving oscillations efficiently with respect to the driving signals, the driving impedance becomes lower.

TABLE 1

|  | Relative driving impedance |
|---|---|
| Comparative Example 1 | 100% |
| First Embodiment | 90% |

As shown in Table 1, where the driving impedance of Comparative Example 1 is 100%, the driving impedance of the first embodiment is 90%, which is 10% lowered, compared with the driving impedance of Comparative Example 1.

As shown in FIG. 4B, in the first embodiment, the pair of driving electrodes 14c and 15c are provided on the arm portion 11. The driving electrode 14c extends from the front face of the arm portion 11 to the inner side face S1 of the arm portion 11. The driving electrode 15c extends from the back face of the arm portion 11 to the inner side face S1 of the arm portion 11. Likewise, the pair of driving electrodes 14d and 15d are provided on the arm portion 12. The driving electrode 14d extends from the front face of the arm portion 12 to the inner side face S2 of the arm portion 12. The driving electrode 15d extends from the back face of the arm portion 12 to the inner side face S2 of the arm portion 12. In this embodiment, the pair of driving electrodes 14c and 15c and the pair of driving electrodes 14d and 15d provided on the arm portions 11 and 12 extend from the front faces and the back faces of the arm portions 11 and 12 to the inner side faces S1 and S2, which are the side faces of the two arm portion 11 and 12 facing each other.

As shown in FIG. 4A, in Comparative Example 1, only electric fields E1 directed from the front faces of the arm portions 11 and 12 to the back faces of the arm portions 11 and 12 are generated. In the first embodiment, on the other hand, not only the electric fields E1 directed from the front faces of the arm portions 11 and 12 to the back faces of the arm portions 11 and 12, but also electric fields E2 are generated by the inner side faces S1 and S2 of the arm portions 11 and 12. Accordingly, the electric field density in the arm portions 11 and 12 of this embodiment can be made higher than that in Comparative Example 1. In this manner, the efficiency of driving oscillations with respect to the driving signals in the arm portions 11 and 12 of the first embodiment, or the driving efficiency, can be made higher than that in Comparative Example 1. Thus, the driving impedance can be lowered. With lower driving impedance, higher sensitivity can be achieved in a piezoelectric gyro or the like. Accordingly, the first embodiment can increase the sensitivity of a piezoelectric gyro or the like with a simple structure having the driving electrodes rearranged.

Figure 5:
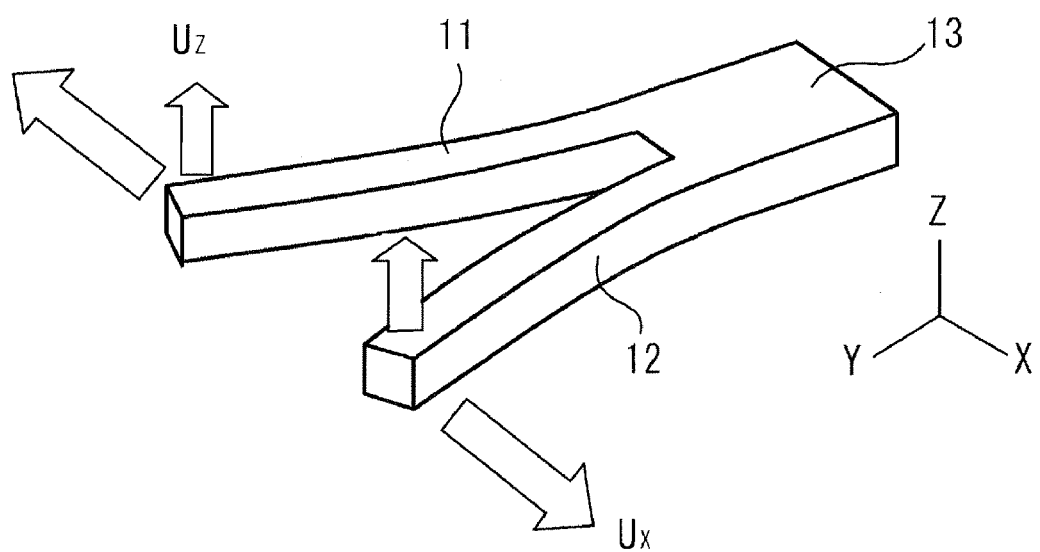
FIG. 5 illustrates tilting oscillation.

FIG. 5 illustrates tilting oscillations caused while a tuning-fork oscillator is having driving oscillations. As shown in FIG. 5, driving oscillations that cause the arm portions 11 and 12 to open and close mainly in the X-axis direction are caused by applying a driving signal to the driving electrodes (not shown) of the tuning-fork oscillator. The displacement caused by the driving oscillation in the arm portions 11 and 12 is set as Ux. During the driving oscillation, oscillations are caused so that the arm portions 11 and 12 bend in the Z-axis direction, which is the thickness direction of the arm portions 11 and 12. The displacement caused by the tilting oscillation in the arm portions 11 and 12 is set as Uz. Since the tilting oscillation involves displacement mainly in the Z-axis direction, the efficiency of the driving oscillation becomes lower. As a result, the driving impedance becomes higher. Also, since the tilting oscillations are oscillations in the same direction as sensing oscillations, errors might be caused in sensing angular velocity.

Table 2 shows the results of simulations carried out to measure the tilting oscillations of the tuning-fork oscillator of the angular velocity sensor of Comparative Example 1 and the tuning-fork oscillator of the angular velocity sensor of the first embodiment. As Shown in Table 2, the displacement Uz by the tilting oscillation relative to the displacement Ux by the driving oscillation (Uz/Ux) is 0.023 in Comparative Example 1, and is 0.016 in the first embodiment. With those values being standardized by the value of Comparative Example 1, Uz/Ux in the first embodiment is 68%, while Uz/Ux in Comparative Example 1 is 100%. Accordingly, Uz/Ux in the first embodiment is 32% smaller than Uz/Ux in Comparative Example 1.

TABLE 2

|  | Uz/Ux | Relative Uz/Ux |
| --- | --- | --- |
| Comparative Example 1 | 0.023 | 100% |
| First Embodiment | 0.016 | 68% |

Since the first embodiment can increase the driving efficiency, the displacement Ux caused in the arm portions 11 and 12 by driving oscillations becomes larger, when the same driving signal is applied to the first embodiment and Comparative Example 1. Accordingly, as shown in Table 2, the displacement Uz by tilting oscillations relative to the displacement Ux by driving oscillations (Uz/Ux) can be reduced. In this manner, an increase in driving impedance and an error in sensing angular velocity can be prevented.

In the first embodiment, the base portion 13 and the arm portions 11 and 12 have simple structures formed with piezoelectric single-crystal made of lithium niobate. With these structures, the process of bonding two tuning-fork oscillators directly to each other as disclosed in Japanese Unexamined Patent Publication No. 2001-165664 becomes unnecessary, and the production costs can be lowered accordingly. Also, since no bonding is required, a decrease in driving efficiency due to bonding misalignment can be prevented. The same effects as above can be achieved not only with piezoelectric single-crystal made of lithium niobate but also with piezoelectric single-crystal made of lithium tantalate.

In the first embodiment, the pair of driving electrodes 14c and 15c are provided on the arm portion 11, and the pair of driving electrodes 14d and 15d are provided on the arm portion 12. In other words, the pair of driving electrodes 14c and 15c and the pair of driving electrodes 14d and 15d are provided on the two respective arm portions 11 and 12 that have driving oscillations with respect to each other. However, the present invention is not limited to that structure, and a pair of driving electrodes are provided on only one of the two arm portions that have driving oscillations with respect to each other, as the driving oscillations are possible. However, a structure having a pair of driving electrodes provided on each of the two arm portions is more preferred, as a good balance is kept in the amplitude of driving oscillations.

Also, in the first embodiment, the portion of driving electrode 14c provided on the front face of the arm portion 11 and the portion of the driving electrode 14c provided on the inner side face S1 of the arm portion 11 are connected by an entire connecting portion B, as shown in FIG. 3A. However, they may be connected by part of the connecting portion B. In such a case, the electric field density can also be made higher, and the driving efficiency can be increased. The same applies to each of the driving electrodes 14d, 15c, and 15d.

Figure 6A:
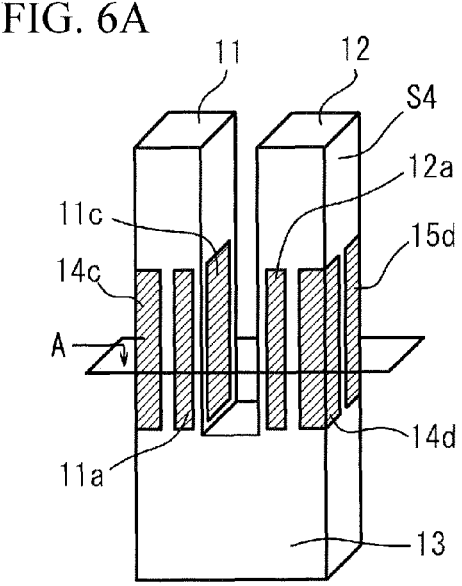
FIG. 6A is a perspective view of the front face of an angular velocity sensor in accordance with a first modification of the first embodiment.
Figure 6B:
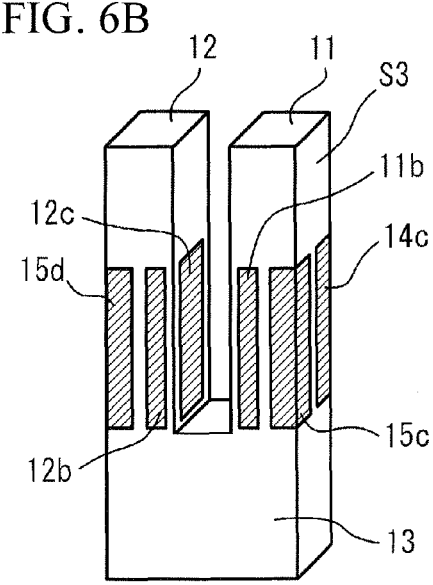
FIG. 6B is a perspective view of the back face of the angular velocity sensor of the first modification.
Figure 6C:
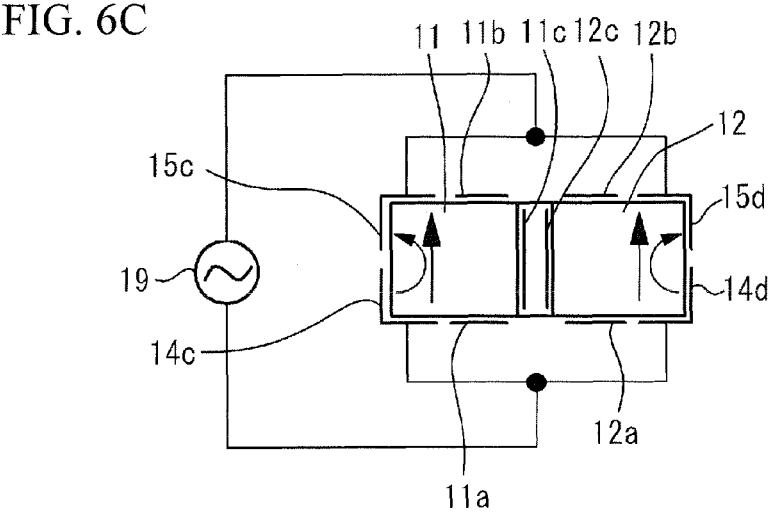
FIG. 6C is a schematic view of a structure in which the angular velocity sensor is connected to a driving power source.

FIG. 6A is a perspective view of the front face of the tuning-fork oscillator of an angular velocity sensor in accordance with a first modification of the first embodiment. FIG. 6B is a perspective view of the back face of the tuning-fork oscillator. It should be noted that only the driving electrodes and the sensing electrodes provided on the arm portions 11 and 12 are shown, but the other electrodes are not shown in those drawings. FIG. 6C is a schematic view of a structure in which a driving power source 19 is connected to the tuning-fork oscillator of the angular velocity sensor in accordance with the first modification of the first embodiment. FIG. 6C shows the A section of the tuning-fork oscillator of FIG. 6A, seen from the opposite side from the base portion 13.

As shown in FIGS. 6A and 6B, sensing electrodes 11a, 11b, and 11c, and driving electrodes 14c and 15c are provided on the arm portion 11. Likewise, sensing electrodes 12a, 12b, and 12c, and driving electrodes 14d and 15d are provided on the arm portion 12.

The driving electrode 14c provided on the front face of the arm portion 11 extends from the front face of the arm portion 11 to the side face S3 of the arm portion 11 on the opposite side from the side face facing the arm portion 12, and the driving electrode 15c provided on the back face of the arm portion 11 extends from the back face of the arm portion 11 to the side face S3 of the arm portion 11 on the opposite side from the side face facing the arm portion 12. Likewise, the driving electrode 14d provided on the front face of the arm portion 12 extends from the front face of the arm portion 12 to the side face S4 of the arm portion 12 on the opposite side from the side face facing the arm portion 11, and the driving electrode 15d provided on the back face of the arm portion 12 extends from the back face of the arm portion 12 to the side face S4 of the arm portion 12 on the opposite side from the side face facing the arm portion 11. In other words, the pair of driving electrodes 14c and 15c and the pair of driving electrodes 14d and 15d extend to the outer side faces S3 and S4 that are the side faces on the opposite sides from the side faces facing each other in the two arm portions 11 and 12 that have driving oscillations with respect to each other. Here, the side face S3 of the arm portion 11 and the side face S4 of the arm portion 12 are referred to as the outer side faces of the arm portions 11 and 12.

As shown in FIG. 6C, a positive driving signal is applied to the driving electrode 14c on the front face of the arm portion 11 and the driving electrode 14d on the front face of the arm portion 12, and a negative driving signal is applied to the driving electrode 15c on the back face of the arm portion 11 and the driving electrode 15d on the back face of the arm portion 12. With those driving signals, an electric field directed from the driving electrode 14c to the driving electrode 15c is generated in the arm portion 11, and an electric field directed from the driving electrode 14d to the driving electrode 15d is generated in the arm portion 12. In other words, a driving signal is applied to each pair of driving electrodes provided on the two arm portions 11 and 12 that have driving oscillations with respect to each other, so that the electric fields generated in the two arm portions 11 and 12 are directed in the same direction. In this manner, the arm portions 11 and 12 have driving oscillations with respect to each other.

In the first modification of the first embodiment, the pairs of driving electrodes are provided on the outer side faces S3 and S4 that are the side faces on the opposite side from the side faces facing each other in the two arm portions 11 and 12 that have driving oscillations with respect to each other, as shown in FIGS. 6A and 6B. Accordingly, the electric field density in the arm portions 11 and 12 becomes higher than that in Comparative Example 1, and the driving efficiency of the arm portions 11 and 12 can be improved, as in the first embodiment.

Since the first modification of the first embodiment can improve the driving efficiency, the first modification can also lower the driving impedance and reduce the displacement Uz by tilting oscillation relative to the displacement Ux by driving oscillation, like the first embodiment.

Second Embodiment

Figure 7A:
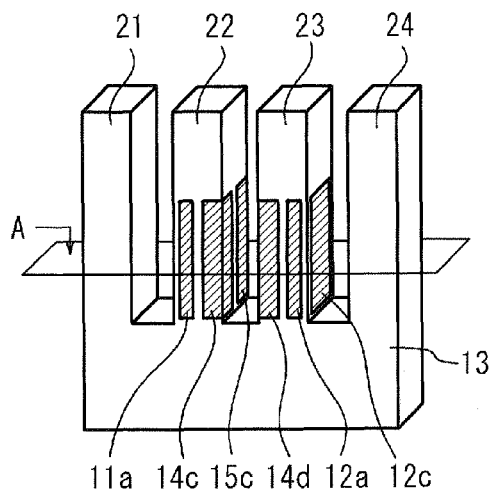
FIG. 7A is a perspective view of the front face of an angular velocity sensor in accordance with a second embodiment of the present invention.
Figure 7B:
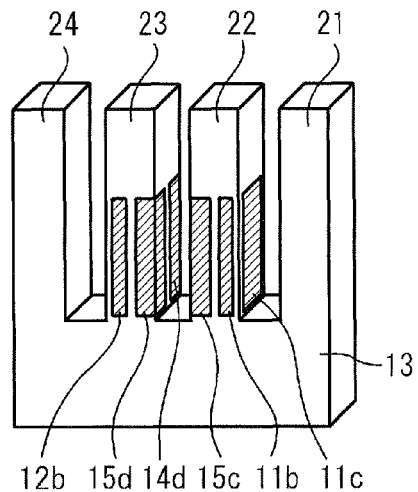
FIG. 7B is a perspective view of the back face of the angular velocity sensor of the second embodiment.
Figure 7C:
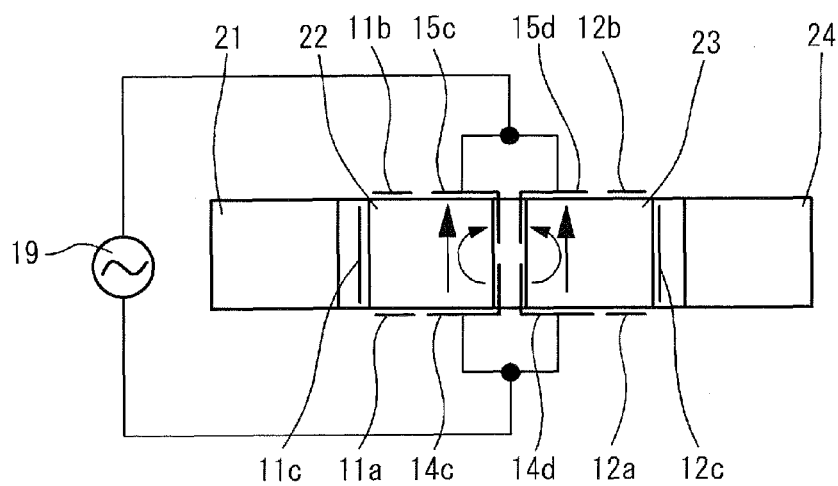
FIG. 7C is a schematic view of a structure in which the angular velocity sensor is connected to a driving power source.

A second embodiment of the present invention is an example of an angular velocity sensor that has a tuning-fork oscillator formed with four arm portions. The inner two of the arm portions of the tuning-fork oscillator have driving oscillations. FIG. 7A is a perspective view of the front face of the tuning-fork oscillator of the angular velocity sensor in accordance with the second embodiment. FIG. 7B is a perspective view of the back face of the tuning-fork oscillator. It should be noted that only the driving electrodes and the sensing electrodes provided on arm portions 22 and 23 are shown, but the other electrodes are not shown in those drawings. FIG. 7C is a schematic view of a structure in which a driving power source 19 is connected to the tuning-fork oscillator of the angular velocity sensor in accordance with the second embodiment. FIG. 7C shows the A section of the tuning-fork oscillator of FIG. 7A, seen from the opposite side from the base portion 13.

As shown in FIGS. 7A and 7B, the tuning-fork oscillator has four arm portions 21, 22, 23, and 24 extending from the base portion 13. The arm portions 22 and 23 have the same electrode patterns of driving electrodes and sensing electrodes as those of the arm portions 11 and 12 of the tuning-fork oscillator of the angular velocity sensor in accordance with the first embodiment.

As shown in FIG. 7C, a positive driving signal is applied to the driving electrodes 14c and 14d, and a negative driving signal is applied to the driving electrodes 15c and 15d, as in the first embodiment. With those driving signals, the arm portions 22 and 23 have driving oscillations with respect to each other. To maintain a balance with the driving oscillations of the arm portions 22 and 23, the arm portions 21 and 24 also have driving oscillations. The driving oscillations of a pair of arm portions 22 and 23 have the opposite phase to that of the driving oscillations of a pair of arm portions 21 and 24.

Figure 8A:
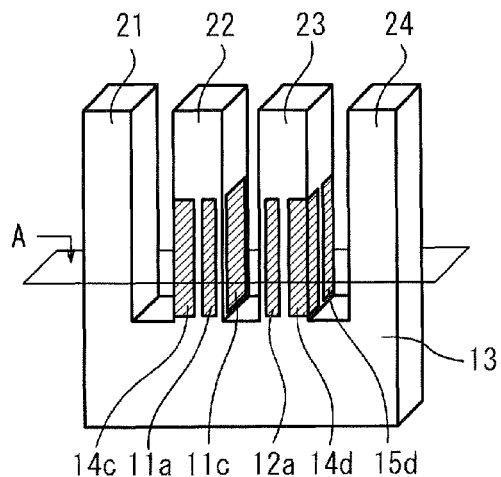
FIG. 8A is a perspective view of the front face of an angular velocity sensor in accordance with a first modification of the second embodiment.
Figure 8B:
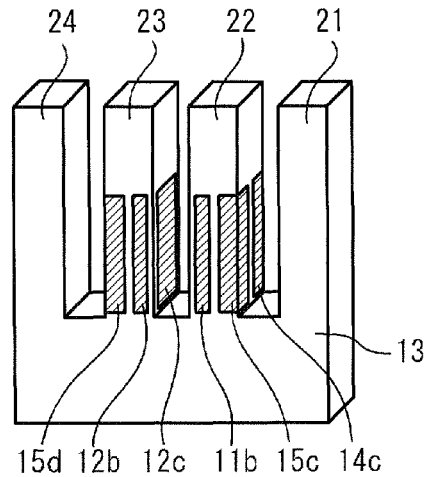
FIG. 8B is a perspective view of the back face of the angular velocity sensor of the first modification.
Figure 8C:
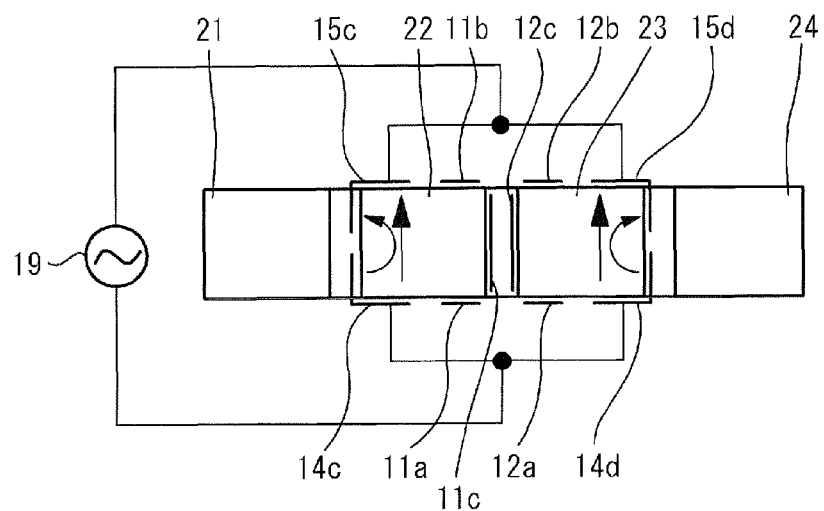
FIG. 8C is a schematic view of a structure in which the angular velocity sensor is connected to a driving power source.

FIG. 8A is a perspective view of the front face of the tuning-fork oscillator of an angular velocity sensor in accordance with a first modification of the second embodiment. FIG. 8B is a perspective view of the back face of the tuning-fork oscillator. It should be noted that only the driving electrodes and the sensing electrodes provided on the arm portions 22 and 23 are shown, but the other electrodes are not shown in those drawings. FIG. 8C is a schematic view of a structure in which a driving power source 19 is connected to the tuning-fork oscillator of the angular velocity sensor in accordance with the first modification of the second embodiment. FIG. 8C shows the A section of the tuning-fork oscillator of FIG. 8A, seen from the opposite side from the base portion 13.

As shown in FIGS. 8A and 8B, the arm portions 22 and 23 have the same electrode patterns of driving electrodes and sensing electrodes as those of the arm portions 11 and 12 of the tuning-fork oscillator of the angular velocity sensor in accordance with the first modification of the first embodiment.

As shown in FIG. 8C, a positive driving signal is applied to the driving electrodes 14c and 14d, and a negative driving signal is applied to the driving electrodes 15c and 15d, as in the first modification of the first embodiment. With those driving signals, the arm portions 22 and 23 have driving oscillations with respect to each other. To maintain a balance with the driving oscillations of the arm portions 22 and 23, the arm portions 21 and 24 also have driving oscillations. The driving oscillations of a pair of arm portions 22 and 23 have the opposite phase to that of the driving oscillations of a pair of arm portions 21 and 24.

Figure 9A:
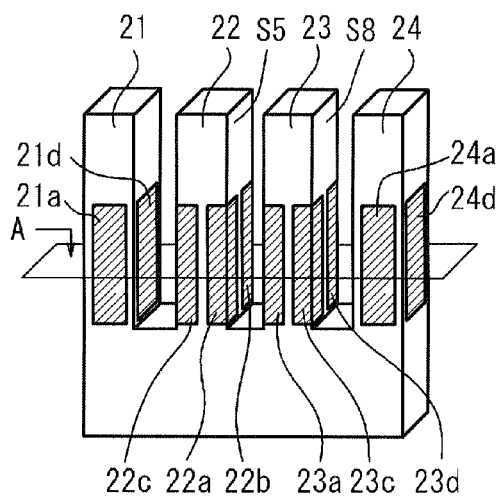
FIG. 9A is a perspective view of the front face of an angular velocity sensor in accordance with a second modification of the second embodiment.
Figure 9B:
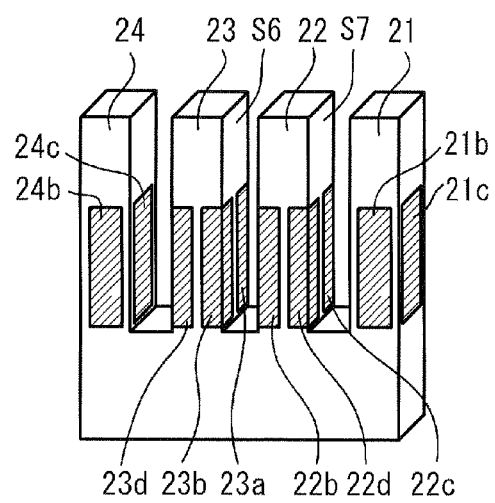
FIG. 9B is a perspective view of the back face of the angular velocity sensor of the second modification.
Figure 9C:
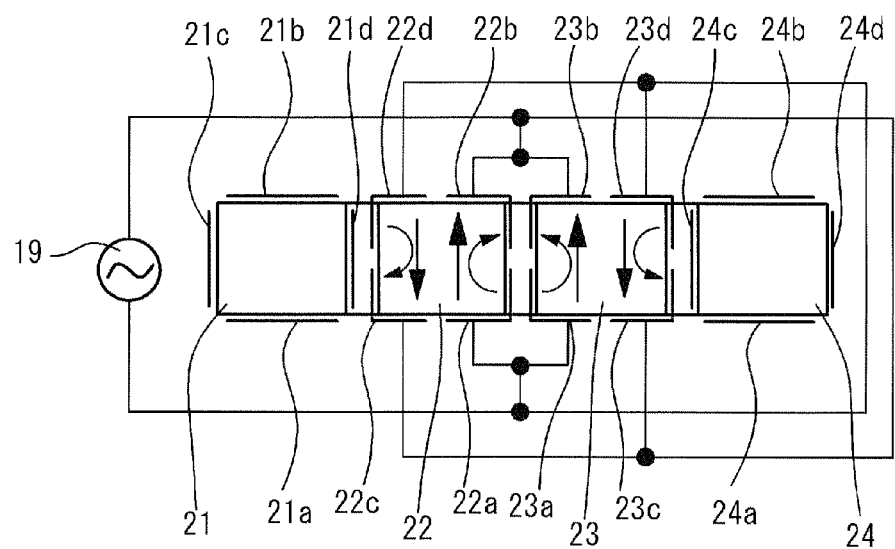
FIG. 9C is a schematic view of a structure in which the angular velocity sensor is connected to a driving power source.

FIG. 9A is a perspective view of the front face of the tuning-fork oscillator of an angular velocity sensor in accordance with a second modification of the second embodiment. FIG. 9B is a perspective view of the back face of the tuning-fork oscillator. It should be noted that only the driving electrodes and the sensing electrodes provided on the arm portions 21, 22, 23, and 24 are shown, but the other electrodes are not shown in those drawings. FIG. 9C is a schematic view of a structure in which a driving power source 19 is connected to the tuning-fork oscillator of the angular velocity sensor in accordance with the second modification of the second embodiment. FIG. 9C shows the A section of the tuning-fork oscillator of FIG. 9A, seen from the opposite side from the base portion 13.

As shown in FIGS. 9A and 9B, sensing electrodes 21a through 21d are provided on the arm portion 21, driving electrodes 22a through 22d are provided on the arm portion 22, driving electrodes 23a through 23d are provided on the arm portion 23, and sensing electrodes 24a through 24d are provided on the arm portion 24.

The driving electrode 22a provided on the front face of the arm portion 22 extends from the front face of the arm portion 22 to the side face S5 of the arm portion 22 facing the arm portion 23. The driving electrode 22c extends from the front face of the arm portion 22 to the side face S7 of the arm portion 22 on the opposite side from the side face facing the arm portion 23. The driving electrode 22b provided on the back face of the arm portion 22 extends from the back face of the arm portion 22 to the side face S5 of the arm portion 22 facing the arm portion 23. The driving electrode 22d extends from the back face of the arm portion 22 to the side face S7 of the arm portion 22 on the opposite side from the side face facing the arm portion 23. The driving electrodes 22a and 22b form a pair of driving electrodes, and the driving electrodes 22c and 22d form another pair of driving electrodes. Accordingly, two pairs of driving electrodes are formed. Likewise, the driving electrode 23a provided on the front face of the arm portion 23 extends from the front face of the arm portion 23 to the side face S6 of the arm portion 23 facing the arm portion 22. The driving electrode 23c extends from the front face of the arm portion 23 to the side face S8 of the arm portion 23 on the opposite side from the side face facing the arm portion 22. The driving electrode 23b provided on the back face of the arm portion 23 extends from the back face of the arm portion 23 to the side face S6 of the arm portion 23 facing the arm portion 22. The driving electrode 23d extends from the back face of the arm portion 23 to the side face S8 of the arm portion 23 on the opposite side from the side face facing the arm portion 22. The driving electrodes 23a and 23b form a pair of driving electrodes, and the driving electrodes 23c and 23d form another pair of driving electrodes. Accordingly, two pairs of driving electrodes are formed. The side face S5 of the arm portion 22 and the side face S6 of the arm portion 23 are referred to as the inner side faces, and the side face S7 of the arm portion 22 and the side face S8 of the arm portion 23 are called the outer side faces.

As shown in FIG. 9C, a positive driving signal is applied to the driving electrode 22a on the front face of the arm portion 22 and the driving electrode 23a on the front face of the arm portion 23, and a negative driving signal is applied to the driving electrode 22b on the back face of the arm portion 22 and the driving electrode 23b on the back face of the arm portion 23. A negative driving signal is applied to the driving electrode 22c on the front face of the arm portion 22 and the driving electrode 23c on the front face of the arm portion 23, and a positive driving signal is applied to the driving electrode 22d on the back face of the arm portion 22 and the driving electrode 23d on the back face of the arm portion 23. With those driving signals, an electric field directed from the driving electrode 22a to the driving electrode 22b and an electric field directed from the driving electrode 22d to the driving electrode 22c are generated in the arm portion 22. An electric field directed from the driving electrode 23a to the driving electrode 23b and an electric field directed from the driving electrode 23d to the driving electrode 23c are generated in the arm portion 23. In this structure, the electric fields on the sides of the inner side faces S5 and S6 in the two arm portions 22 and 23 are directed in the same direction, and the electric fields on the sides of the outer side faces S7 and S8 in the two arm portions 22 and 23 are directed in the same direction. The electric fields on the sides of the inner side faces S5 and S6 are directed in the opposite direction to the direction in which the electric fields on the sides of the outer side faces S7 and S8 are directed. With this arrangement, the arm portions 22 and 23 have driving oscillations with respect to each other. To maintain a balance with the driving oscillations of the arm portions 22 and 23, the arm portions 21 and 24 also have driving oscillations. The driving oscillations of the pair of arm portions 22 and 23 have the opposite phase to that of the driving oscillations of the pair of arm portions 21 and 24.

In the second modification of the second embodiment, one pair of driving electrodes 22a and 22b of the two pairs of driving electrodes provided on the arm portion 22 extend to the inner side face S5 of the arm portion 22, and the other pair of driving electrodes 22c and 22d extends to the outer side face S7 of the arm portion 22, as shown in FIGS. 9A and 9B. Likewise, one pair of driving electrodes 23a and 23b of the two pairs of driving electrodes provided on the arm portion 23 extend to the inner side face S6 of the arm portion 23, and the other pair of driving electrodes 23c and 23d extends to the outer side face S8 of the arm portion 23. In this structure, the two pairs of driving electrodes provided on the arm portions 22 and 23 extend to the inner side faces and the outer side faces of the arm portions 22 and 23. Accordingly, more electric fields are generated from the side faces of the arm portions 22 and 23 than in the second embodiment and the first modification of the second embodiment. In this manner, the electric field density in the arm portions 22 and 23 can be made even higher than the electric field density achieved in the second embodiment and the first modification of the second embodiment, and the driving efficiency of the arm portions 22 and 23 can be further improved.

In accordance with the second modification of the second embodiment, the driving efficiency can be made even higher than in the second embodiment and the first modification of the second embodiment. Thus, the driving impedance can be made lower, and the displacement Uz of tilting oscillations relative to the displacement Ux of driving oscillations (Uz/Ux) can be made smaller than in the second embodiment and the first modification of the second embodiment.

Third Embodiment

Figure 10A:
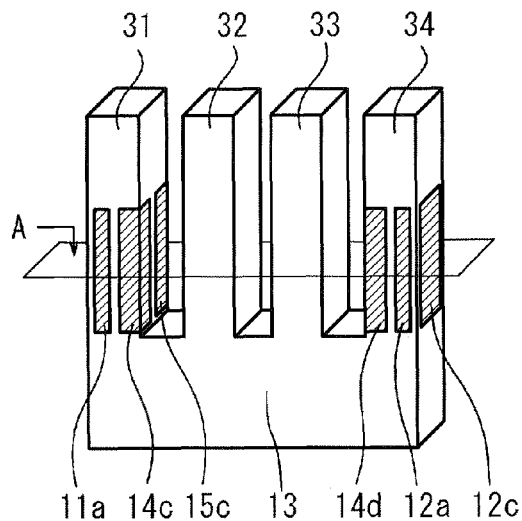
FIG. 10A is a perspective view of the front face of an angular velocity sensor in accordance with a third embodiment of the present invention.
Figure 10B:
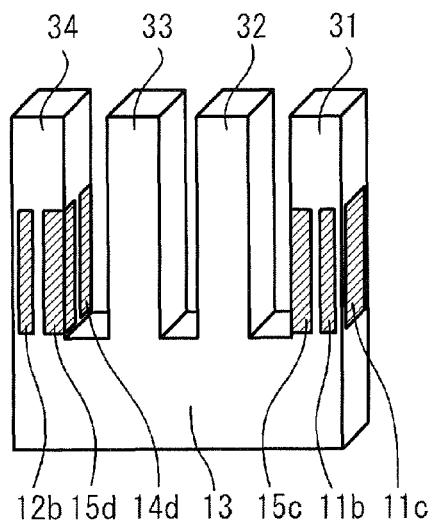
FIG. 10B is a perspective view of the back face of the angular velocity sensor of the third embodiment.
Figure 10C:
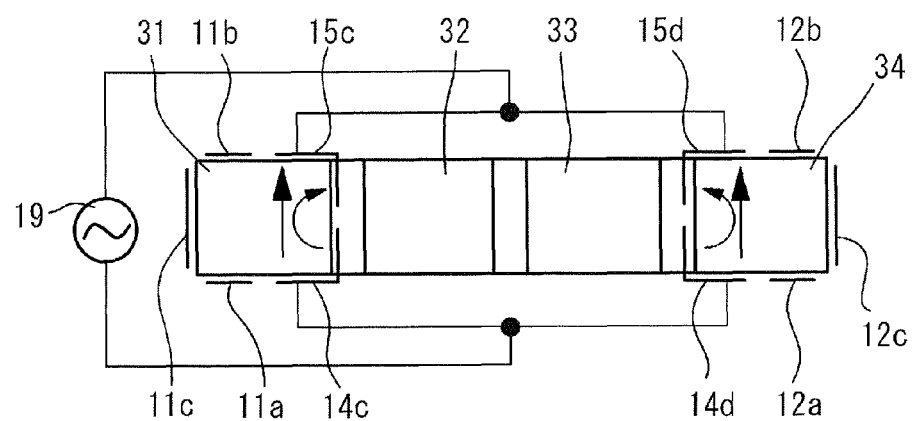
FIG. 10C is a schematic view of a structure in which the angular velocity sensor is connected to a driving power source.

A third embodiment of the present invention is an example of an angular velocity sensor that has a tuning-fork oscillator having four arm portions. The outer two arm portions of the tuning-fork oscillator have driving oscillations. FIG. 10A is a perspective view of the front face of the tuning-fork oscillator of the angular velocity sensor in accordance with the third embodiment. FIG. 10B is a perspective view of the back face of the tuning-fork oscillator. It should be noted that only the driving electrodes and the sensing electrodes provided on arm portions 31 and 34 are shown, but the other electrodes are not shown in those drawings. FIG. 10C is a schematic view of a structure in which a driving power source 19 is connected to the tuning-fork oscillator of the angular velocity sensor in accordance with the third embodiment. FIG. 10C shows the A section of the tuning-fork oscillator of FIG. 10A, seen from the opposite side from the base portion 13.

As shown in FIGS. 10A and 10B, the tuning-fork oscillator has four arm portions 31, 32, 33, and 34 extending from the base portion 13. The arm portions 31 and 34 have the same electrode patterns of driving electrodes and sensing electrodes as those of the arm portions 11 and 12 of the tuning-fork oscillator of the angular velocity sensor in accordance with the first embodiment. The arm portions 32 and 33 exist between the arm portions 31 and 34. The side face of the arm portions on which the driving electrodes 14c and 15c are provided is an inner side face, and the side face of the arm portion 34 on which the driving electrodes 14d and 15d is also an inner side face. The side faces of the arm portions 31 and 34 on the opposite sides from the inner side faces are outer side faces.

As shown in FIG. 10C, a positive driving signal is applied to the driving electrodes 14c and 14d, and a negative driving signal is applied to the driving electrodes 15c and 15d, as in the first embodiment. With those driving signals, the arm portions 31 and 34 have driving oscillations with respect to each other. To maintain a balance with the driving oscillations of the arm portions 31 and 34, the arm portions 32 and 33 also have driving oscillations. The driving oscillations of a pair of arm portions 31 and 34 have the opposite phase to that of the driving oscillations of a pair of arm portions 32 and 33.

Figure 11A:
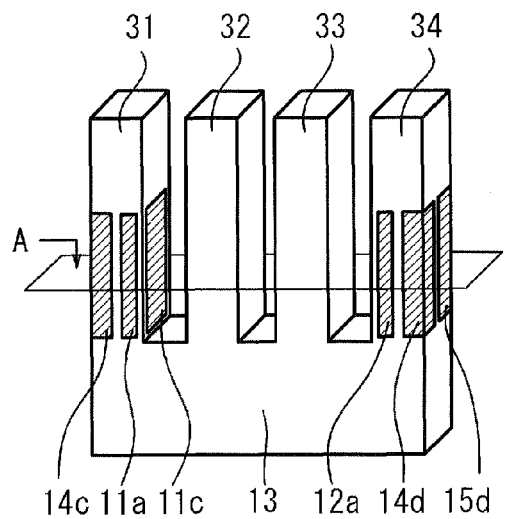
FIG. 11A is a perspective view of the front face of an angular velocity sensor in accordance with a first modification of the third embodiment.
Figure 11B:
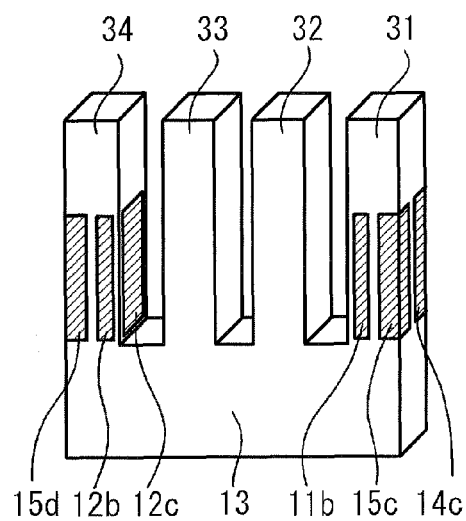
FIG. 11B is a perspective view of the back face of the angular velocity sensor of the first modification.
Figure 11C:
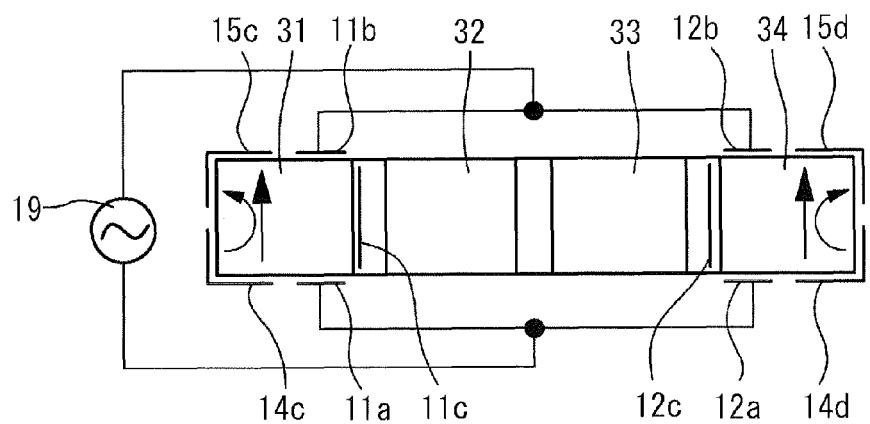
FIG. 11C is a schematic view of a structure in which the angular velocity sensor is connected to a driving power source.

FIG. 11A is a perspective view of the front face of the tuning-fork oscillator of an angular velocity sensor in accordance with a first modification of the third embodiment. FIG. 11B is a perspective view of the back face of the tuning-fork oscillator. It should be noted that only the driving electrodes and the sensing electrodes provided on the arm portions 31 and 34 are shown, but the other electrodes are not shown in those drawings. FIG. 11C is a schematic view of a structure in which a driving power source 19 is connected to the tuning-fork oscillator of the angular velocity sensor in accordance with the first modification of the third embodiment. FIG. 11C shows the A section of the tuning-fork oscillator of FIG. 11A, seen from the opposite side from the base portion 13.

As shown in FIGS. 11A and 11B, the arm portions 31 and 34 have the same electrode patterns of driving electrodes and sensing electrodes as those of the arm portions 11 and 12 of the tuning-fork oscillator of the angular velocity sensor in accordance with the first modification of the first embodiment.

As shown in FIG. 11C, a positive driving signal is applied to the driving electrodes 14c and 14d, and a negative driving signal is applied to the driving electrodes 15c and 15d, as in the first modification of the first embodiment. With those driving signals, the arm portions 31 and 34 have driving oscillations with respect to each other. To maintain a balance with the driving oscillations of the arm portions 31 and 34, the arm portions 32 and 33 also have driving oscillations. The driving oscillations of a pair of arm portions 31 and 34 have the opposite phase to that of the driving oscillations of a pair of arm portions 32 and 33.

Figure 12A:
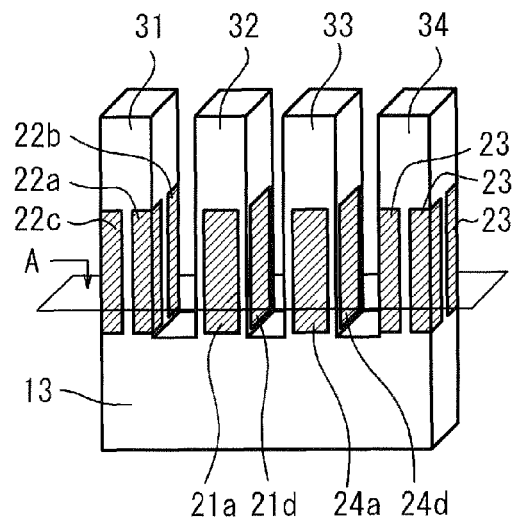
FIG. 12A is a perspective view of the front face of an angular velocity sensor in accordance with a second modification of the third embodiment.
Figure 12B:
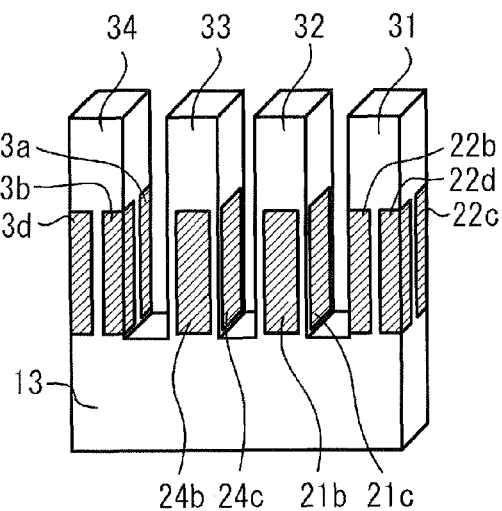
FIG. 12B is a perspective view of the back face of the angular velocity sensor of the second modification.
Figure 12C:
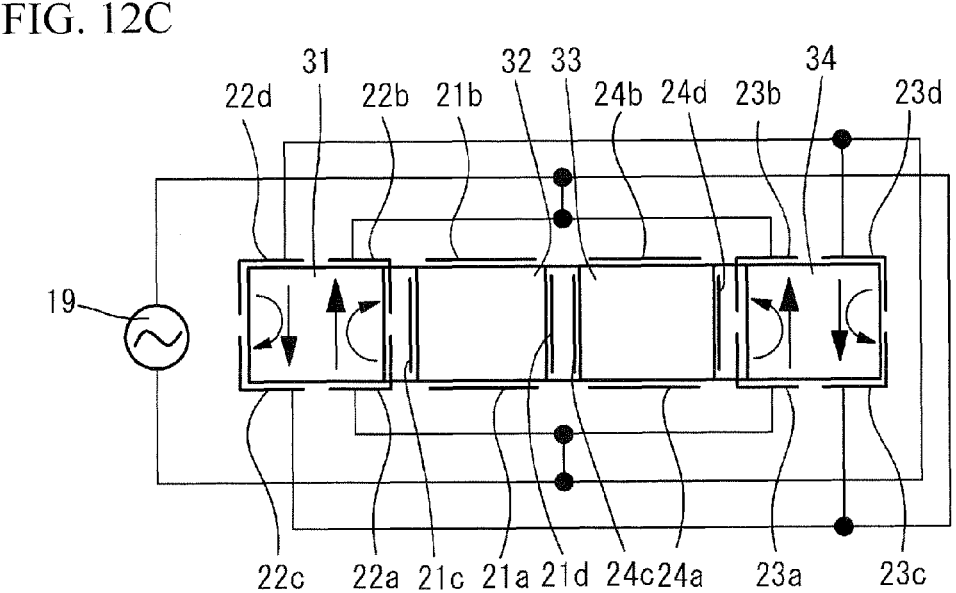
FIG. 12C is a schematic view of a structure in which the angular velocity sensor is connected to a driving power source.

FIG. 12A is a perspective view of the front face of the tuning-fork oscillator of an angular velocity sensor in accordance with a second modification of the third embodiment. FIG. 12B is a perspective view of the back face of the tuning-fork oscillator. It should be noted that only the driving electrodes and the sensing electrodes provided on the arm portions 31, 32, 33, and 34 are shown, but the other electrodes are not shown in those drawings. FIG. 12C is a schematic view of a structure in which a driving power source 19 is connected to the tuning-fork oscillator of the angular velocity sensor in accordance with the second modification of the third embodiment. FIG. 12C shows the A section of the tuning-fork oscillator of FIG. 12A, seen from the opposite side from the base portion 13.

As shown in FIGS. 12A and 12B, the arm portions 31 and 34 have the same electrode patterns of driving electrodes as those of the arm portions 22 and 23 of the tuning-fork oscillator of the angular velocity sensor in accordance with the second modification of the second embodiment. The arm portions 32 and 33 have the same electrode patterns of sensing electrodes as those of the arm portions 21 and 24 of the tuning-fork oscillator of the angular velocity sensor in accordance with the second modification of the second embodiment.

As shown in FIG. 12C, a positive driving signal is applied to the driving electrode 22a on the front face of the arm portion 31 and the driving electrode 23a on the front face of the arm portion 34, and a negative driving signal is applied to the driving electrode 22b on the back face of the arm portion 31 and the driving electrode 23b on the back face of the arm portion 34, as in the second modification of the second embodiment. A negative driving signal is applied to the driving electrode 22c on the front face of the arm portion 31 and the driving electrode 23c on the front face of the arm portion 34, and a positive driving signal is applied to the driving electrode 22d on the back face of the arm portion 31 and the driving electrode 23d on the back face of the arm portion 34. With those driving signals, the arm portions 31 and 34 have driving oscillations with respect to each other. To maintain a balance with the driving oscillations of the arm portions 31 and 34, the arm portions 32 and 33 also have driving oscillations. The driving oscillations of the pair of arm portions 31 and 34 have the opposite phase to that of the driving oscillations of the pair of arm portions 32 and 33.

Fourth Embodiment

Figures 13A, 13B:
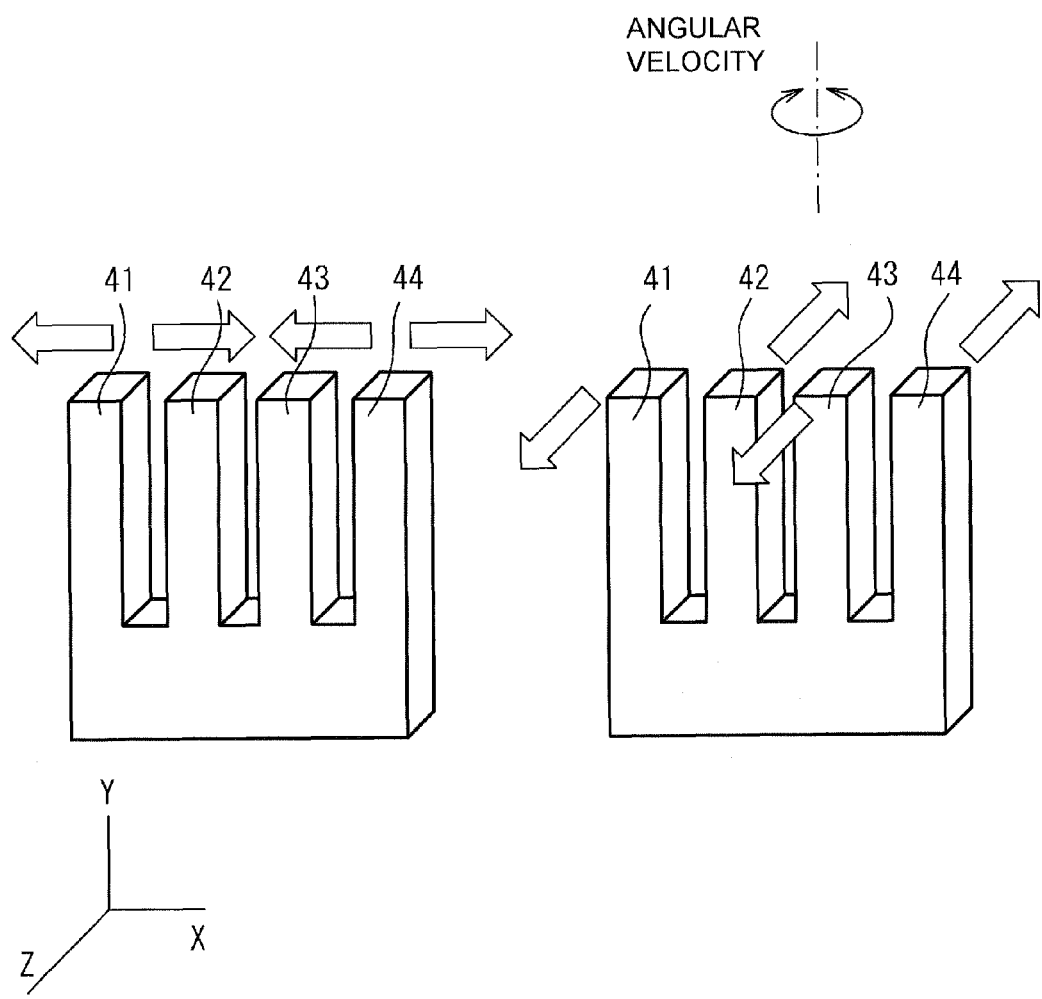
FIG. 13A illustrates driving oscillations of four arm portions.
FIG. 13B illustrates sensing oscillations of four arm portions.

A fourth embodiment of the present invention is an example of an angular velocity sensor that has a tuning-fork oscillator formed with four arm portions. In this angular velocity sensor, all the four arm portions of the tuning-fork oscillator have driving oscillations. FIGS. 13A and 13B illustrate cases where the four arm portions of the tuning-fork oscillator are having driving oscillations and sensing oscillations. As shown in FIG. 13A, when driving signals are applied to the driving electrodes (not shown) of the tuning-fork oscillator, such driving oscillations are caused that each pair of arm portions 41 and 42, arm portions 42 and 43, and arm portions 43 and 44 open and close with respect to each other arm portion. If angular velocity is applied to the Y-axis, such sensing oscillations are caused that each pair of arm portions 41 and 42, arm portions 42 and 43, and arm portions 43 and 44 oscillate back and forth with respect to each other arm portion by virtue of the Coriolis force, as shown in FIG. 13B.

Figure 14A:
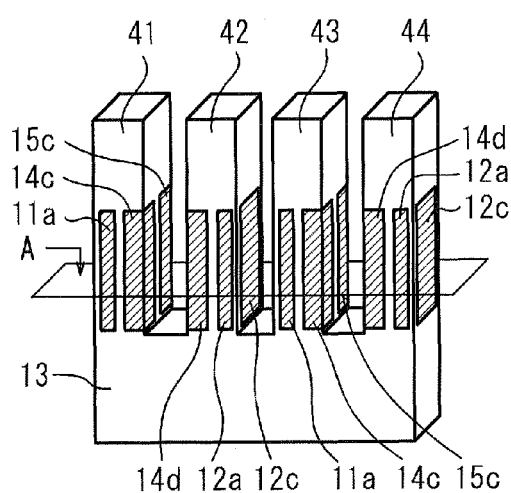
FIG. 14A is a perspective view of the front face of an angular velocity sensor in accordance with a fourth embodiment of the present invention.
Figure 14B:
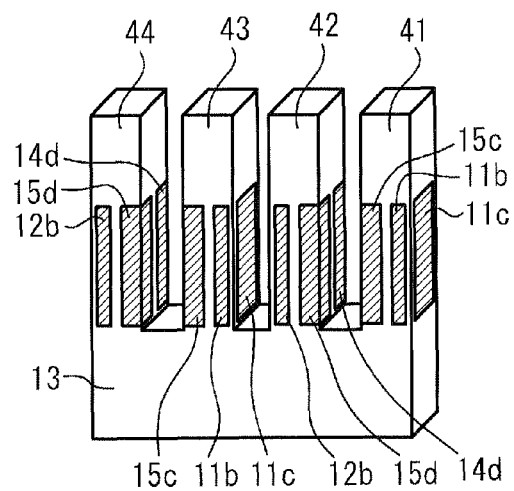
FIG. 14B is a perspective view of the back face of the angular velocity sensor of the fourth embodiment.
Figure 14C:
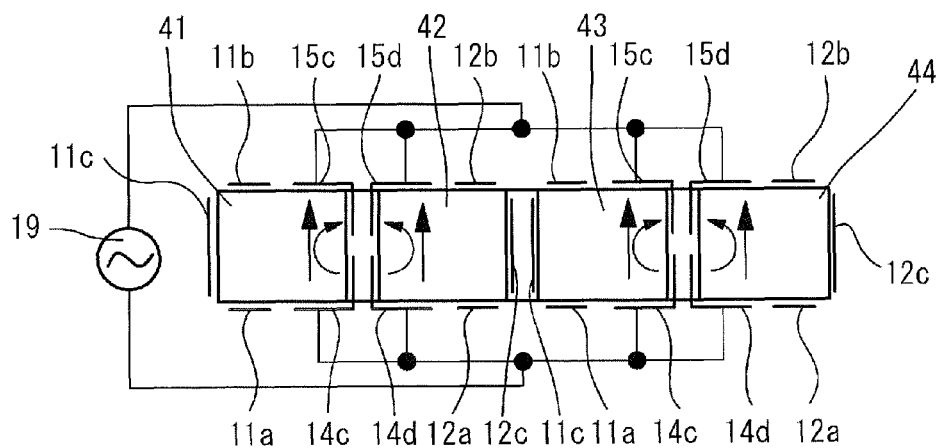
FIG. 14C is a schematic view of a structure in which the angular velocity sensor is connected to a driving power source.

FIG. 14A is a perspective view of the front face of the tuning-fork oscillator of the angular velocity sensor in accordance with the fourth embodiment. FIG. 14B is a perspective view of the back face of the tuning-fork oscillator. It should be noted that only the driving electrodes and the sensing electrodes provided on the arm portions 41, 42, 43, and 44 are shown, but the other electrodes are not shown in those drawings. FIG. 14C is a schematic view of a structure in which a driving power source 19 is connected to the tuning-fork oscillator of the angular velocity sensor in accordance with the fourth embodiment. FIG. 14C shows the A section of the tuning-fork oscillator of FIG. 14A, seen from the opposite side from the base portion 13.

As shown in FIGS. 14A and 14B, the tuning-fork oscillator has the four arm portions 41, 42, 43, and 44 extending from the base portion 13. The arm portions 41 and 42 have the same electrode patterns of driving electrodes and sensing electrodes as those of the arm portions 11 and 12 of the tuning-fork oscillator of the angular velocity sensor in accordance with the first embodiment. Likewise, the arm portions 43 and 44 have the same electrode patterns of driving electrodes and sensing electrodes as those of the arm portions 11 and 12 of the tuning-fork oscillator of the angular velocity sensor in accordance with the first embodiment. Meanwhile, the arm portions 42 and 43 have the same electrode patterns of driving electrodes and sensing electrodes as those of the arm portions 11 and 12 of the tuning-fork oscillator of the angular velocity sensor in accordance with the first modification of the first embodiment.

As shown in FIG. 14C, a positive driving signal is applied to the driving electrodes 14c and 14d on the front faces of the arm portions 41 and 42, and a negative driving signal is applied to the driving electrodes 15c and 15d on the back faces of the arm portions 41 and 42. With those driving signals, electric fields directed in the same direction are generated in the arm portions 41 and 42, and the arm portions 41 and 42 have driving oscillations with respect to each other. Likewise, a positive driving signal is applied to the driving electrodes 14c and 14d on the front faces of the arm portions 42 and 43, and a negative driving signal is applied to the driving electrodes 15c and 15d on the back faces of the arm portions 42 and 43. A positive driving signal is applied to the driving electrodes 14c and 14d on the front faces of the arm portions 43 and 44, and a negative driving signal is applied to the driving electrodes 15c and 15d on the back face of the arm portions 43 and 44. With those driving signals, electric fields directed in the same direction are generated in the arm portions 42 and 43, and electric fields directed in the same direction are also generated in the arm portions 43 and 44. Accordingly, the arm portions 42 and 43 have driving oscillations with respect to each other, and the arm portions 43 and 44 also have driving oscillations with respect to each other.

FIG. 15A is a perspective view of the front face of the tuning-fork oscillator of an angular velocity sensor in accordance with a first modification of the fourth embodiment. FIG. 15B is a perspective view of the back face of the tuning-fork oscillator. It should be noted that only the driving electrodes and the sensing electrodes provided on the arm portions 41, 42, 43, and 44 are shown, but the other electrodes are not shown in those drawings. FIG. 15C is a schematic view of a structure in which a driving power source 19 is connected to the tuning-fork oscillator of the angular velocity sensor in accordance with the first modification of the fourth embodiment. FIG. 15C shows the A section of the tuning-fork oscillator of FIG. 15A, seen from the opposite side from the base portion 13.

As shown in FIGS. 15A and 15B, the arm portions 41 and 42 have the same electrode patterns of driving electrodes and sensing electrodes as those of the arm portions 11 and 12 of the tuning-fork oscillator of the angular velocity sensor in accordance with the first modification of the first embodiment. Likewise, the arm portions 43 and 44 have the same electrode patterns of driving electrodes and sensing electrodes as those of the arm portions 11 and 12 of the tuning-fork oscillator of the angular velocity sensor in accordance with the first modification of the first embodiment. Meanwhile, the arm portions 42 and 43 have the same electrode patterns of driving electrodes and sensing electrodes as those of the arm portions 11 and 12 of the tuning-fork oscillator of the angular velocity sensor in accordance with the first modification of the first embodiment.

As shown in FIG. 15C, a positive driving signal is applied to the driving electrodes 14c and 14d on the front faces of the arm portions 41 through 44, and a negative driving signal is applied to the driving electrodes 15c and 15d on the back faces of the arm portions 41 through 44. With those driving signals, each pair of arm portions 41 and 42, 42 and 43, and 43 and 44 have driving oscillations with respect to each other arm portion.

In accordance with the first through fourth embodiments, the electric field density and the driving efficiency can be made higher by providing a pair of driving electrodes extending from the front face and the back face to a side face of at least one of the arm portions. Particularly, if two or more of the arm portions each have a pair of driving electrodes, the driving efficiency of the arm portions that have driving oscillations can be improved. Also, the number of arm portions is two in the first embodiment, and the number of arm portions is four in each of the second through fourth embodiments. Since arm portions have driving oscillations with respect to each other, it is preferable that the number of arm portions is an even number.

Although a few preferred embodiments of the present invention have been shown and described, it would be appreciated by those skilled in the art that changes may be made in these embodiments without departing from the principles and spirit of the invention, the scope of which is defined in the claims and their equivalents.

The present application is based on Japanese Patent Application No. 2006-346807 filed on Dec. 22, 2006, the entire disclosure of which is hereby incorporated by reference.

What is claimed is:

1. An angular velocity sensor comprising:
    a tuning-fork oscillator that includes a base portion, a plurality of arm portions extending from the base portion, a pair of driving electrodes, and sensing electrodes,
    wherein the pair of driving electrodes are provided on each of two arm portions that have driving oscillations with respect to each other among the plurality of arm portions,
    wherein one of the pair of driving electrodes extends continuously from a front face to a side face in the each of two arm portions and the other of the pair of driving electrodes extends continuously from a back face to the side face in the each of two arm portions,
    wherein the pair of driving electrodes generates electric field between the front face and the back face and from the side face to the side face, and
    wherein the sensing electrodes are provided on the each of two arm portions.

2. The angular velocity sensor as claimed in claim 1, wherein the driving electrode provided on the front face at a corner of the front face and the side face and the driving electrode provided on the side face at the corner are the same length in a extension direction of the arm portion and the driving electrode provided on the back face at a corner of the back face and the side face and the driving electrode provided on the side face at the corner are the same length in the extension direction of the arm portion.

3. The angular velocity sensor as claimed in claim 1, wherein the pair of driving electrodes are provided to extend to inner side faces that are side faces of the two arm portions, the inner side faces facing each other.

4. The angular velocity sensor as claimed in claim 3, wherein a driving signal is applied to each of the pair of driving electrodes provided on each of the two arm portions, so that electric fields generated in the two arm portions are directed in the same direction.

5. The angular velocity sensor as claimed in claim 1, wherein the pair of driving electrodes are provided to extend to outer side faces that are side faces of the two arm portions, the outer side faces being on the opposite side from side faces of the two arm portions facing each other.

6. The angular velocity sensor as claimed in claim 1, wherein the base portion and the plurality of arm portions are formed with piezoelectric single-crystal.

7. An angular velocity sensor comprising:
    a tuning-fork oscillator that includes a base portion, a plurality of arm portions extending from the base portion, and a pair of driving electrodes,
    wherein the pair of driving electrodes are provided on each of two arm portions that have driving oscillations with respect to each other among the plurality of arm portions,
    wherein one of the pair of driving electrodes extends continuously from a front face to a side face in the each of two arm portions and the other of the pair of driving electrodes extends continuously from a back face to the side face in the each of two arm portions,
    wherein the pair of driving electrodes generates electric field between the front face and the back face and from the side face to the side face,
    wherein two pairs of the driving electrodes are provided on each of the two arm portions, one of the two pairs of the driving electrodes are provided to extend to inner side faces that are side faces of the two arm portions, the inner side faces facing each other and the other one of the two pairs of the driving electrodes are provided to extend to outer side faces that are side faces of the two arm portions, the outer side faces being on the opposite side from the inner side faces facing each other, and
    wherein a driving signal is applied to each driving electrode of the two pairs of the driving electrodes provided on each of the two arm portions, so that electric fields generated on the sides of the inner side faces of the two arm portions are directed in the same direction, electric fields generated on the sides of outer side faces of the two arm portions are directed in the same direction, and the electric fields on the sides of inner side faces are directed in the opposite direction from the direction in which the electric fields on the sides of the outer side faces are directed.

* * * * *